Feb. 23, 1926.　　　　　　　　　　　　　　　1,574,303
C. G. OLSON
PROCESS AND MACHINE FOR DRESSING ABRASIVE ELEMENTS
Filed July 5, 1923　　　　2 Sheets-Sheet 1

Inventor:
Carl G. Olson
By Cheever & Cox
Attys.

Feb. 23, 1926. 1,574,303
C. G. OLSON
PROCESS AND MACHINE FOR DRESSING ABRASIVE ELEMENTS
Filed July 5, 1923 2 Sheets-Sheet 2

Inventor:
Carl G. Olson
By Cheever & Cox
Attys.

Patented Feb. 23, 1926.

1,574,303

UNITED STATES PATENT OFFICE.

CARL G. OLSON, OF CHICAGO, ILLINOIS, ASSIGNOR TO ILLINOIS TOOL WORKS, OF CHICAGO, ILLINOIS, A CORPORATION OF ILLINOIS.

PROCESS AND MACHINE FOR DRESSING ABRASIVE ELEMENTS.

Application filed July 5, 1923. Serial No. 649,600.

*To all whom it may concern:*

Be it known that I, CARL G. OLSON, a citizen of the United States, residing at Chicago, in the county of Cook and State of Illinois, have invented a certain new and useful Improvement in Processes and Machines for Dressing Abrasive Elements, of which the following is a specification.

My invention relates to machines and processes for dressing abrasive elements such as grinding wheels, grinding helicoids and the like, and is related to the inventions shown in my prior applications filed October 12th, 1921, Serial No. 507,219, and October 31st, 1921, Serial No. 511,795. In said earlier applications I have shown dressing mechanism in which the point of a scarifying tool is caused to rotate at high speed through an orbit, an arc of which lies in the surface to be produced, the result being that the scarfs produced by the tool taken in the aggregate envelop the surface to be produced. In those prior applications the point of the tool passes through a complete circle although it is in contact with the work for only a comparatively small portion of the complete rotation. In other words, the scarifying tool is in contact with the work throughout an arc which is only a comparatively small portion of the complete circle, the result being that the tool is idle for the major portion of its period of rotation. The object of my present invention is to reduce or entirely eliminate this period of inactivity, and I have accomplished it by oscillating the tool, so that the scarifying point passes rapidly back and forth through an arc all or the greater portion of which lies in the surface to be produced. The consequence is that the point of the tool is in active engagement with the work all or practically all of the time. This reduces the time required to dress a given amount of surface and it also renders the operation smoother. Another object of the invention is to still further reduce the time of operation, and to this end I have provided mechanism adapted to act upon both sides of the worm at once.

I accomplish my objects in the manner illustrated in the accompanying drawings, in which—

Like numerals denote like parts throughout the several views.

Figure 2:
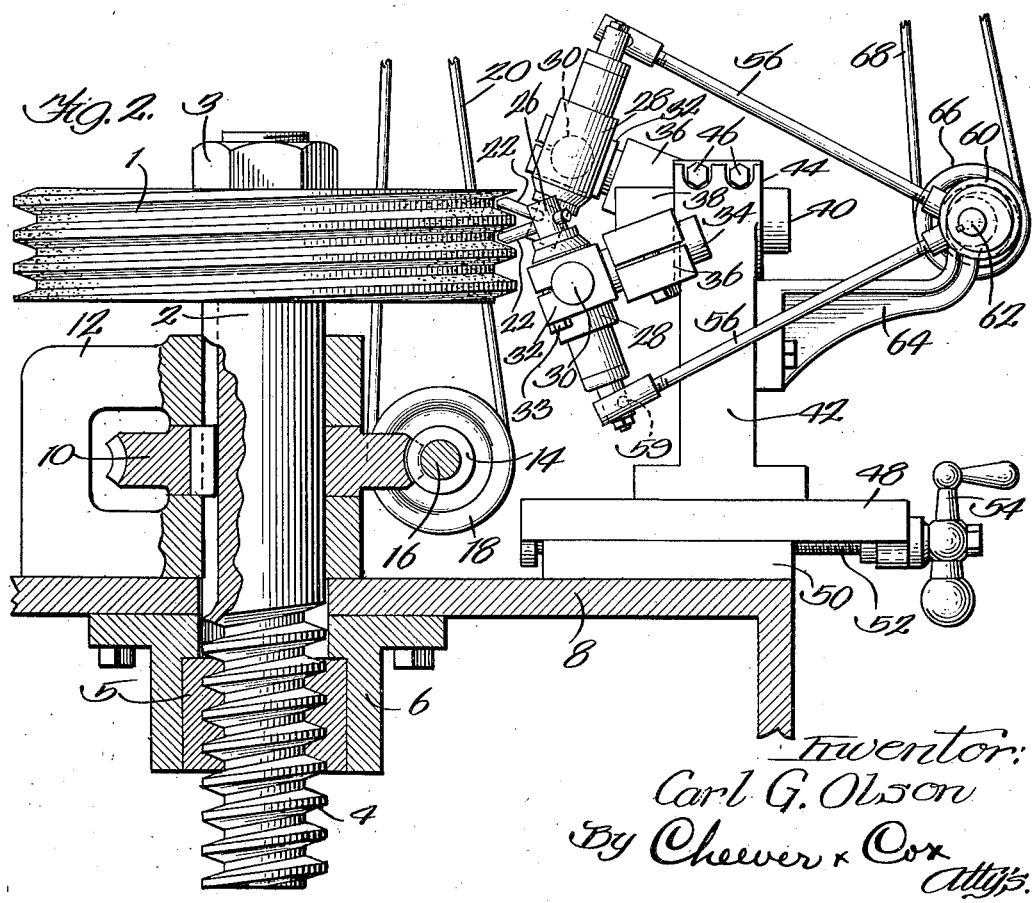
Figure 2 is a side elevation partly in section showing the parts illustrated in Figure 1.

In the form illustrated, the work 1 consists of a worm or helicoid of abrasive material. This might be termed a "grinding hob", such hobs being used for grinding the teeth of gear wheels and the like to render them true and accurate. This grinding hob 1, which constitutes the work, is secured to a work spindle 2 by means of a nut 3 or other appropriate means. At the lower end the spindle has a lead screw 4 which works in a nut 5 mounted in a bracket 6, bolted or otherwise fastened to the main frame 8 of the machine. The pitch of the lead screw corresponds to the pitch of the helicoid, and produces axial travel of the work relatively to the tool. A worm wheel 10 is splined to the spindle 2 and is vertically confined within the branches of the yoke 12 as best shown in Figure 2. The worm wheel meshes with and is rotated by a worm 14 which is rigidly secured to a power shaft 16. This shaft is driven by a sheave 18 and belt 20 or other suitable source of power. The construction is such that when the sheave rotates it will rotate the work 14 and worm wheel 10, and the latter will rotate the work spindle so that the lead screw 4 will cause the work to travel axially (in the present case vertically).

Figure 3:
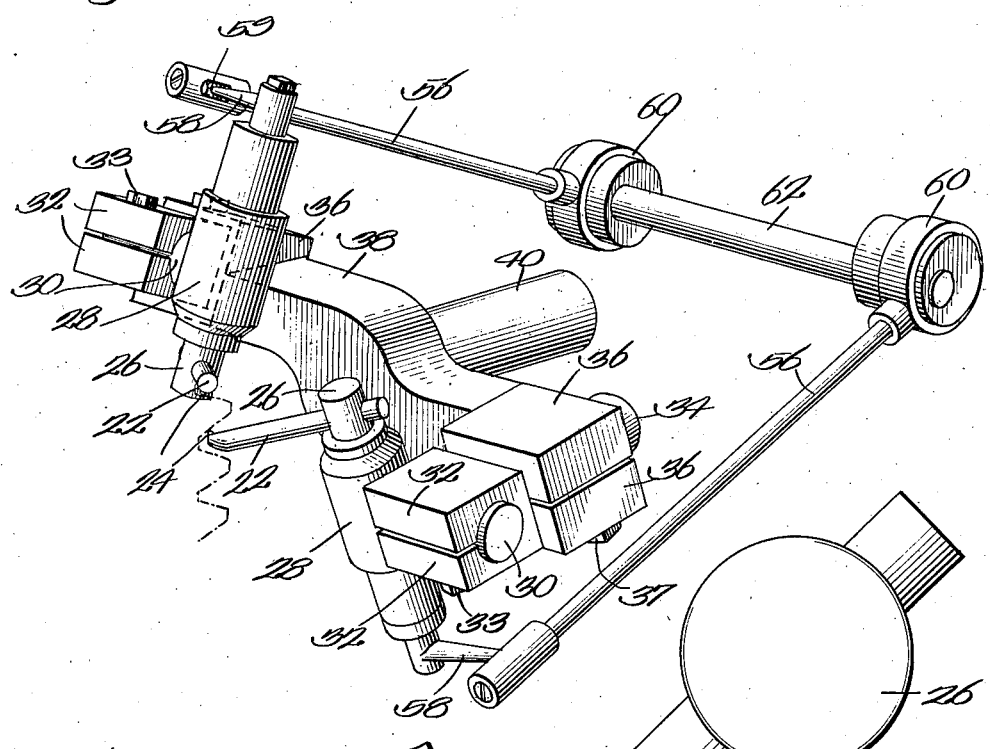
Figure 3 is a fragmentary perspective view showing the scarifying tools and the mechanism more intimately associated therewith.
Figure 4:
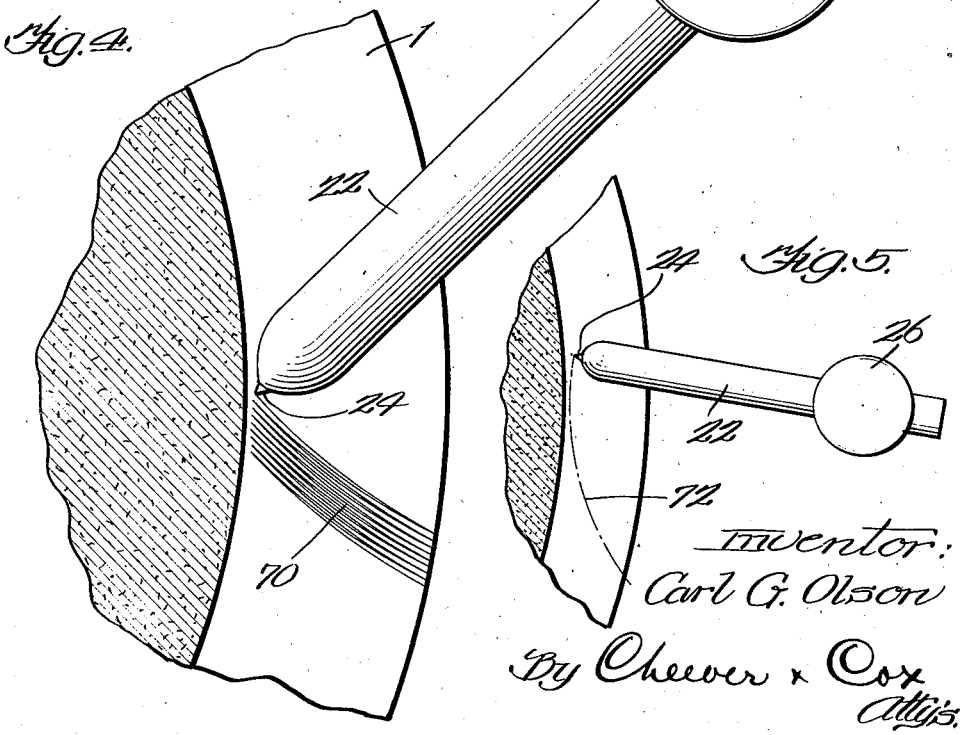
Figures 4 and 5 are diagrammatic views illustrating different ways of carrying out my new method.
Figure 5:
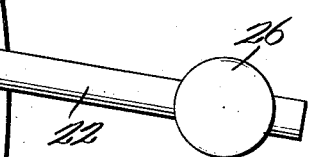

Now to describe the scarifying tools and their method of operation: The tools 22 are provided with scarifying points 24 capable of making scarfs or scratches on the work. In Figures 4 and 5 these tools are illustrated more or less diagrammatically in the sense that the scarifying points are, for illustration shown in a different location on the tool than they usually occupy in practice. They are usually located at the side of the tool as shown in Figures 1, 2 and 3, although they may be otherwise located under certain conditions.

The shanks of these tools are mounted in rock shafts 26 which are journaled in bearings 28. Said bearings have stems 30 projecting laterally and held within split blocks 32, equipped with bolts 33 so that the blocks may clamp onto the stem. Said blocks in turn have stems 34 which project laterally and are mounted in split blocks 36, similarly equipped with clamping bolts 37. There are two pairs of these split blocks 36 and they are connected by a yoke 38 which is provided with a stem 40 mounted in a post 42 shown in Figures 1 and 2. The upper end of the post is provided with split blocks 44 which support the stem 40 and form clamps which may be tightened on stem 40 by means of clamping bolts 46. The various split blocks or clamps form universal supports for the rock shafts so that the latter may be mounted at any desired angle, and in any desired position, but it will be understood that the design of these parts may be greatly varied without departing from the spirit of the invention.

Figure 1:
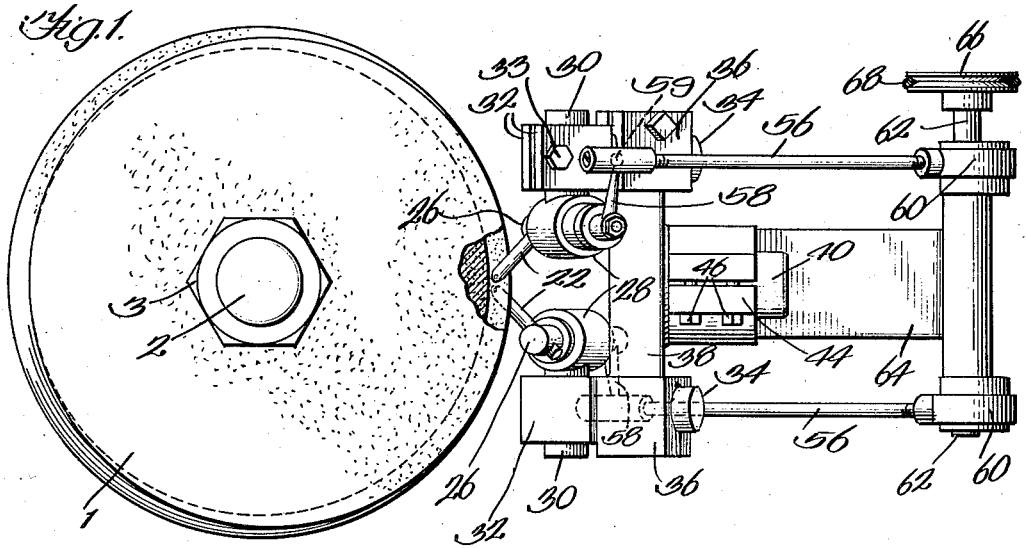
Figure 1 is a top plan view of a machine embodying the invention and capable of operating in accordance with my new method.

The post 42 is mounted upon a cross carriage 48 which slides in stationary guides 50 mounted on the main frame of the machine as shown at the lower right corner of Figure 1. By moving the carriage upon its guides the scarifying tools may be moved bodily toward or from the axis of the work for suitable adjustment of the tools to the work. The position of the carriage is controlled by feed screw 52 operated by a hand lever 54.

The rock shafts are rocked in their bearings by means of connecting rods 56 which are connected at one end to rocker arms 58 projecting laterally from said shafts. To promote flexibility of adjustment it is desirable that a universal type of connection be provided between the rocker arms and their connecting rods, for example, a ball and socket connection 59. The connecting rods are operated by eccentrics 60 mounted upon a shaft 62 journaled in a bracket 64, as best shown at the right portion of Figures 1 and 2. Eccentric shaft 62 is driven by a sheave 66 and belt 68, although it may be driven by any other suitable form of power mechanism.

In practice, when the machine is in its most developed form two scarifying tools will be employed as illustrated and these will be arranged to contact opposite sides of the thread of the work; that is, the scarifying points engage the same portion of the thread on the work, but opposite sides thereof. This not only makes it possible for two tools to be acting upon the work at once, thus reducing the time required to complete the operation, but by exerting pressure in substantially equal amounts in substantially opposite directions, the pressures nullify each other and avoid any tendency to distort or warp the work as a whole. Furthermore, according to the preferred construction the elements which rock the rock shafts are so arranged as to always move the scarifying points in opposite directions from each other. This tends to nullify the tendency of the individual points to accelerate or retard the rotation of the work about its axis. Consequently the work will rotate smoothly and uniformly and avoid the ill effects which might be observed if there were back lash or lost motion between the work spindle and the worm wheel 10 or between said worm wheel and the worm 14.

Operation: When the parts are adjusted in the manner shown in the drawings the sheaves 18 and 66 are started rotating. The rotation of sheave 18 causes the worm wheel 10 to rotate, and this in turn causes the work spindle 2 and the lead screw 4 to rotate. Ordinarily this rotation will be comparatively slow, the purpose being to bring fresh portions of the work under the oscillating scarifying points. As the work rotates about its axis it also moves axially due to the action of the lead screw, thus causing the surface of the helix to always be presented in proper relation to the tool points. The rotation of sheave 66 drives the eccentric shaft 62 and the eccentrics, operating through the connecting rods 56 and rocker arms 58, cause the rock shafts 26 to oscillate rapidly through a limited arc, the length of which will depend upon circumstances. The machine may be set so as to produce scarfs 70 arranged in the manner shown in Figure 4 or so as to produce scarfs 72 arranged as in the manner shown in Figure 5. The short scarfs 70 extend approximately from the point circle to the root circle of the helicoid or grinding hob, and may be regarded as approximately radial. The scarfs 72 shown in Figure 5 traverse a longer path and swing from the point circle to the root circle and on to the point circle. They may be regarded as tangential scarfs. The ultimate effect is substantially the same in either case and the operator may select the form best suited to the conditions in hand.

It will be evident that when the machine is properly set the scarifying points in oscillating back and forth over the surface of the helicoid, which itself is rotating slowly about its axis, will in the aggregate pass over the entire surface of the helicoid, or, in other words, "envelope" it.

It has been mentioned that the rock shafts 26 are universally adjustable in view of the various clamping blocks in which they are directly and indirectly mounted. The result is that said shafts may be adjusted either to a position parallel to the axis of the work or oblique thereto. The latter arrangement is shown in the drawings and is necessary where an ordinary grinding hob is to be trued. If the rock shafts are adjusted parallel to the axis of the work the paths of the scarifying points will lie in a plane at right angles to the axis of the work. When adjusted in this manner the scarifying points may dress the sides of abrasive articles having square threads which are annular instead of helical.

Having thus described my invention what I claim as new and desire to secure by Letters Patent is:

1. The process of dressing preformed, helicoidal and annular surfaces formed on bodies which are rotatable about their axes, said process consisting in causing the point of a pointed scarifying tool to oscillate at high speed through a limited arc lying in the surface to be dressed, and simultaneously causing the work to rotate about its own axis, the tool thereby producing a series of scarfs which in the aggregate envelop the surface to be produced.

2. The process of dressing helicoidal and annular surfaces formed on bodies of abrasive material which are rotatable about an axis and are substantially symmetrical with respect to that axis, said process consisting in causing a scarifying tool to oscillate at high speed through a limited arc lying in the surface to be dressed and simultaneously causing the work to rotate slowly about its own axis.

3. The process of dressing abrasive helicoids consisting in causing a scarifying tool to travel back and forth in an arc which lies in the helicoidal surface, simultaneously causing the rotation of the helicoid about its axis, and simultaneously causing axial travel, bodily, between the tool and the helicoid.

4. The process of dressing preformed helicoidal worms consisting in rotating the worm slowly about its own axis, causing the points of scarifying tools to simultaneously engage opposite sides of the worm at substantially the same portion thereof, causing said points to oscillate at high speed through a limited arc of a circle lying in the helicoidal surfaces of the worm, and causing axial travel between the tools and the work in the direction of the axis of the work.

5. The process of dressing threaded abrasive elements consisting in causing scarifying tools to engage the threads on opposite sides, axially considered, and move simultaneously in opposite directions.

6. The process of dressing threaded abrasive elements consisting in causing scarifying tools to engage the threads on opposite sides, axially considered, and move simultaneously in opposite directions, and also causing the abrasive element to rotate slowly about its own axis.

7. A machine for dressing abrasive elements comprising a work spindle, means for rotating it, a scarifying tool, and means for oscillating said scarifying tool through an arc less than the circumference of a circle.

8. A machine for dressing abrasive elements comprising a work spindle, means for rotating it, a scarifying tool, and means for oscillating said scarifying tool through an arc less than the circumference of a circle, the plane of oscillation being in general transverse to the axis of rotation of the work.

9. A machine for dressing threaded abrasive elements, having a work spindle, means for rotating it, scarifying tools adapted to engage the thread of the abrasive element on opposite sides thereof at approximately the same portion, and means for moving said scarifying points at high speed along arcuate paths in opposite directions.

10. A machine for dressing helically threaded abrasive elements, having a work spindle, means for rotating it, scarifying tools adapted to engage the thread on opposite sides thereof at approximately the same portion, means for moving said scarifying points at high speed along arcuate paths in opposite directions, and means for causing relative travel between the work spindle and the scarifying points in a direction parallel to the axis of the work spindle.

11. A machine for dressing threaded abrasive elements, having a work spindle, means for rotating it, scarifying tools adapted to engage the thread of the abrasive element, and means for moving said scarifying points simultaneously in opposite directions in limited arcuate paths.

12. A machine for dressing helically threaded abrasive elements, having a work spindle, means for rotating it, scarifying tools adapted to engage opposite sides of the thread of the abrasive element at substantially the same portion, means for moving said scarifying point simultaneously in opposite directions, and means for causing relative travel between the work spindle and the scarifying points in a direction parallel to the axis of the work spindle.

In witness whereof, I have hereunto subscribed my name.

CARL G. OLSON.